United States Patent [19]

Eastman

[11] Patent Number: 5,346,442
[45] Date of Patent: Sep. 13, 1994

[54] RANGE SHIFT ARRANGEMENT FOR FOUR-WHEEL DRIVE VEHICLES

[75] Inventor: Richard E. Eastman, Central Square, N.Y.

[73] Assignee: New Venture Gear, Inc., Troy, Mich.

[21] Appl. No.: 932,289

[22] Filed: Aug. 19, 1992

[51] Int. Cl.$^5$ ............................................. F16H 37/06
[52] U.S. Cl. .................. 475/223; 475/269; 475/270; 192/53 F
[58] Field of Search .............. 475/269, 270, 223; 192/53 F

[56] References Cited

U.S. PATENT DOCUMENTS

| | | | |
|---|---|---|---|
| 4,344,335 | 8/1982 | Kawai | 475/223 |
| 4,440,042 | 4/1984 | Holdeman . | |
| 4,625,584 | 12/1986 | Onodera | 475/223 X |
| 4,677,875 | 7/1987 | Batchelor | 475/223 X |
| 4,727,968 | 3/1988 | Chana | 192/53 F |
| 4,770,280 | 9/1988 | Frost | 192/53 F |
| 5,054,335 | 10/1991 | Andrews | 74/665 GA |
| 5,057,062 | 10/1991 | Yamasaki et al. | 475/223 X |
| 5,076,112 | 12/1991 | Williams | 74/337.5 |

Primary Examiner—Leslie A. Braun
Assistant Examiner—Daniel Wittels
Attorney, Agent, or Firm—Harness, Dickey & Pierce

[57] ABSTRACT

A synchronized shift arrangement is disclosed for shifting a planetary-type gear reduction assembly from a low-range operating mode to a high-range operating mode. This arrangement is particularly adapted for use in vehicular power transfer devices, such as four-wheel drive transfer cases, for allowing the vehicle operator to shift "on-the-fly" from a four-wheel low-range drive mode to a four-wheel high-range drive mode without the need of stopping the motor vehicle. In a preferred embodiment, the power transfer apparatus includes a housing, a first member supported for rotation in the housing, a second member supported in the housing for rotation relative to the first member, a planetary gear assembly coupled to the first member for rotatably driving an output member thereof at a reduced ratio relative to the first member, and a clutch sleeve supported for rotation with the second member and which is movable between a first position for coupling the second member to the output member of the planetary gear assembly for rotatably driving the second member at the reduced ratio, and a second position for coupling the second member for rotation with the first member. The power transfer apparatus further includes a synchronizer for causing speed synchronization between the first and second members in response to movement of the clutch sleeve from the first position to said second position.

22 Claims, 4 Drawing Sheets

RANGE SHIFT ARRANGEMENT FOR FOUR-WHEEL DRIVE VEHICLES

BACKGROUND OF THE INVENTION

The present invention relates generally to a shift arrangement for power transfer units and, more particularly, to a synchronized shift arrangement for a planetary gear assembly which may be incorporated into the transfer case of a four-wheel drive vehicle.

Modernly, many light-duty and sport-utility vehicles are equipped with a power transfer unit, such as a four-wheel drive transfer case, for providing a four-wheel drive mode of operation. To accommodate differing road surfaces and conditions, many four-wheel drive transfer cases are equipped with a gear reduction unit for providing a high-range (i.e., direct drive) and a low-range (i.e., reduced ratio drive) in conjunction with the four-wheel drive mode. Most commonly, the gear reduction units used in four-wheel drive transfer cases include either a layshaft arrangement or a planetary gear assembly. Reference may be made to U.S. Pat. No. 4,770,280 for disclosure of an exemplary four-wheel drive transfer case equipped with a dual-speed planetary gear assembly.

Typically, a four-wheel drive transfer case equipped with conventional gear reduction unit can only be shifted between the four-wheel low-range mode and the four-wheel high-range mode when the motor vehicle is in a substantially non-motive condition. During "off-road" use however, the need to stop the vehicle prior to shifting into the four-wheel high-range mode tends to be inconvenient, particularly upon encountering terrain wherein continuation of the vehicle's rolling momentum would provide a smoother transition from four-wheel low-range operation to four-wheel high-range operation. U.S. Pat. No. 5,054,335 to Andrews discloses a four-wheel drive transfer case having a layshaft-type gear reduction unit that can be shifted "on-the-fly" from the four-wheel low-range mode to the four-wheel high-range mode. While such a design has proven to be an advance over conventional layshaft constructions, the teachings are inapplicable to modern four-wheel drive transfer cases equipped with planetary-type gear reduction systems. As such, the need exists for the development of a shift arrangement for shifting the planetary-type gear reduction unit of a four-wheel drive transfer case from the low-range operating mode to the high-range operating mode without stopping the vehicle.

SUMMARY OF THE INVENTION

It is therefore an object of the present invention to provide a shift arrangement for a planetary-type gear reduction unit that permits "on-the-fly" shifting from a low-range operating mode to a high-range operating mode.

It is another object of the present invention to incorporate the improved shift arrangement for planetary-type gear reduction units into four-wheel drive transfer cases. As such, the improved shift arrangement of the present invention permits a vehicle operator to shift the transfer case from the four-wheel low-range mode to the four-wheel high-range mode without stopping the vehicle.

Accordingly, the improved shift arrangement of the present invention includes means for selectively coupling an input member of the planetary-type gear reduction unit to an output member in response to speed synchronization therebetween for establishing a direct-drive mode. More particularly, the improved shift arrangement includes a direct-drive member rotatably driven by the input member of the planetary-type gear reduction unit and a hub member fixed for rotation with the output member. A clutch sleeve is fixed for rotation with the hub member and is axially slidable thereon. Synchronization means are provided for coupling the hub member for driven rotation with the direct-drive member in response to speed synchronization between the input member and the output member.

BRIEF DESCRIPTION OF THE DRAWINGS

Further objects, features and advantages of the present invention will become apparent to those skilled in the art from a reading of the following description and the accompanying drawings in which.

DESCRIPTION OF THE PREFERRED EMBODIMENT

In general, the present invention relates to a shift arrangement that is operable for providing synchronized shifting of a planetary-type gear reduction unit between a Low-Range operating state and a High-Range operating state. Thus, the present invention is adapted for use in a full-time or part-time transfer case of a four-wheel drive vehicle for permitting synchronized "on-the-fly" shifting from a four-wheel low-range (4 WL) drive mode to a four-wheel high-range (4 WH) drive mode.

Figure 1:
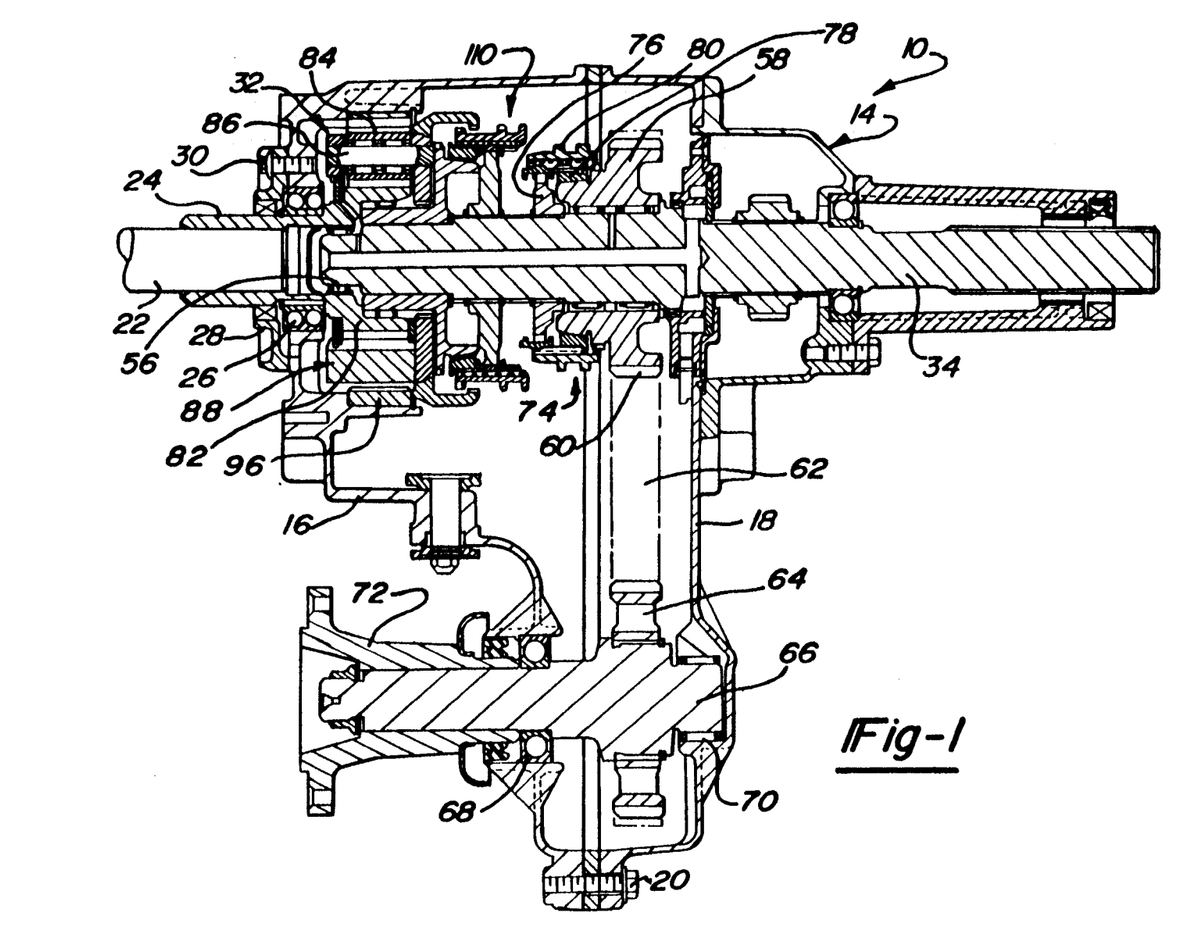
FIG. 1 is a sectional view of an exemplary four-wheel drive transfer case equipped with a planetary-type gear reduction unit and having a synchronized range shift arrangement that is constructed in accordance with a preferred embodiment of the present invention.

With particular reference to FIG. 1 of the drawings, there is shown an exemplary transfer case 10 of the type adapted for use in four-wheel drive motor vehicles. Transfer case 10 includes a housing assembly 14 including front and rear housing sections 16 and 18, respectively, which are suitably interconnected by a plurality of threaded bolts 20. Front housing section 16 receives an externally splined transmission output shaft 22 within an internally splined input shaft 24 such that transmission output shafts 22 and input shaft 24 are rotatably driven by the engine (not shown) of the motor vehicle. Input shaft 24 is shown mounted for rotation in front housing section 16 by a suitable bearing assembly 26. A removable collar 28 is secured by a plurality of bolts 30 to front housing section 16 for retaining bearing assembly 26 therein.

As is known, transfer case 10 is operable for transferring power (i.e., drive torque) from the engine to the vehicle's front and rear sets of ground-engaging wheels. In addition, transfer case 10 is shown to include a planetary-type gear reduction unit, such as planetary gear assembly 32, that is operably installed between input shaft 24 and an output member 34. Planetary gear assembly 32 has a "High-Range" operating state for directly driving output member 34, a "Low-Range" operating state for driving output member 34 at a reduced ratio, and a "Neutral" state for interrupting the transfer of drive torque to output member 34. Planetary gear assembly 32 is similar to that shown and described in U.S. Pat. No. 5,076,112 to Williams, owned by the common assignee of this invention, the disclosure being expressly incorporated by reference herein. As will be described hereinafter, the present invention is directed to a synchronized shift arrangement which permits the vehicle operator to shift planetary gear assembly 32 from the "Low-Range" operating state to the "High-Range" operating state while the motor vehicle is moving.

Figure 2:
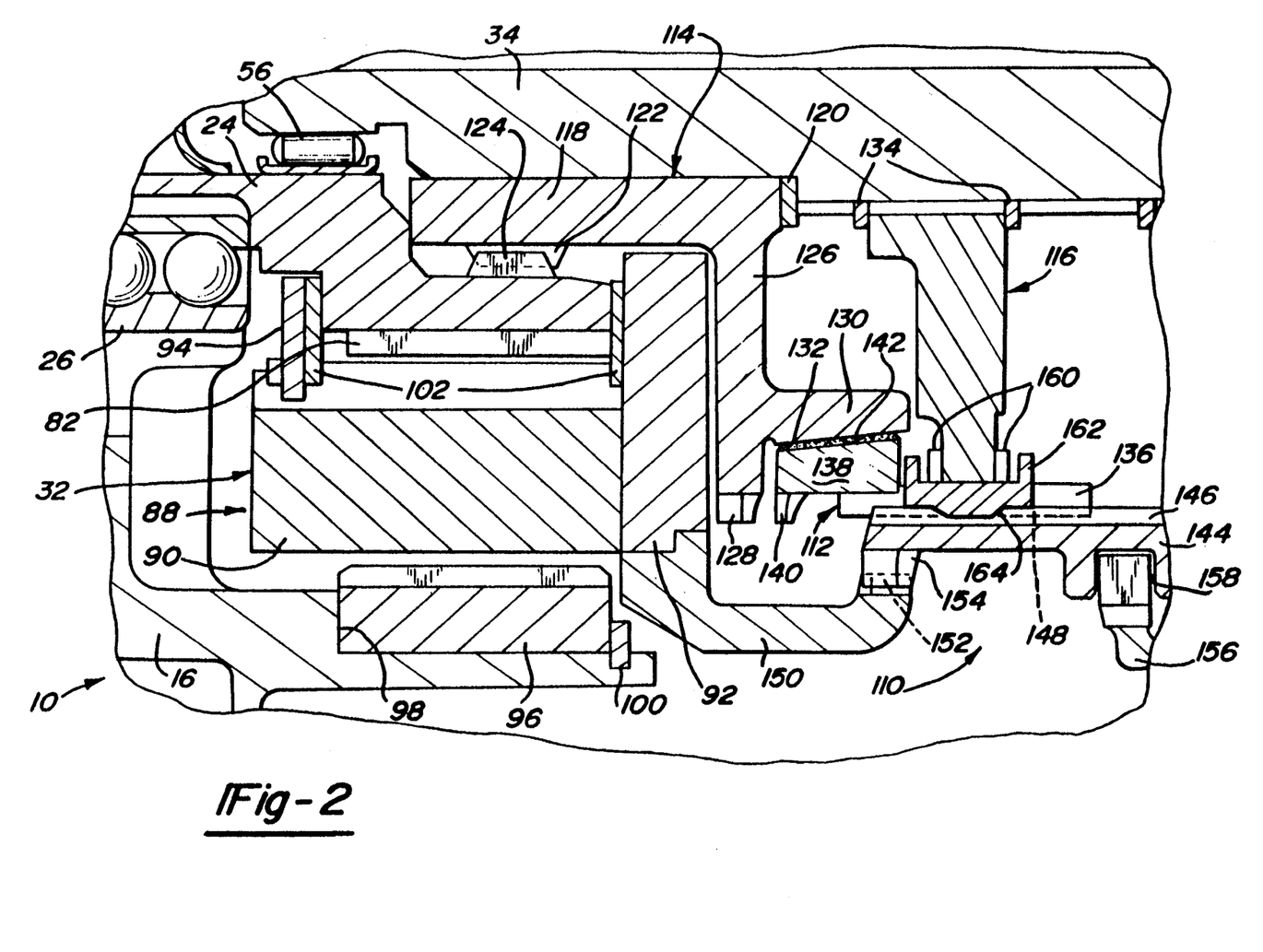
FIG. 2 is an enlarged partial view of FIG. 1 showing the planetary-type gear reduction unit shifted to a four-wheel low-range operating mode.

As best seen from FIGS. 1 and 2, output member 34 of transfer case 10 is a rear output shaft which is aligned on the longitudinal axis of input shaft 24 and has a first end piloted in an axial bore of input shaft 24 via a suitable bearing assembly 56. As is known, the opposite end of rear output shaft 34 is adapted for connection to the rear drive shaft (not shown) of the motor vehicle for delivering drive torque to the rear axle assembly and, in turn, to the rear set of ground-engaging wheels. A chain carrier 58 is shown rotatably journalled on rear output shaft 34 and includes a drive sprocket 60 drivingly engaging a chain, shown in dashed lines at 62, and which is coupled to a lower driven sprocket 64. Driven sprocket 64 is, in turn, coupled to a second output member which is shown as a front output shaft 66. Front output shaft 66 is mounted for rotation within housing assembly 14 by suitable bearing assemblies 68 and 70. Typically, front output shaft 66 is connected by a coupling 72 to the motor vehicle's front drive shaft (not shown) for driving the front axle assembly and, in turn, the front set of ground-engaging wheels. Reference may be had to U.S. Pat. No. 4,381,828 issued May 3, 1983 for details of a typical transfer case mounting arrangement showing its connection to the motor vehicle's front and rear drive axles, the disclosure of which is expressly incorporated by reference herein.

Since transfer case 10 is shown as a part-time power transfer device, a shift arrangement is provided for permitting the vehicle operator to selectively shift between a two-wheel high-range (2 WH) drive mode and a four-wheel high-range (4 WH) drive mode. The "Mode" shift arrangement includes a conventional strut-type synchronizer clutch apparatus 74 for permitting the vehicle operator to shift transfer case 10 "on-the-fly" between the (2 WH) and (4 WH) drive modes. Synchronizer clutch apparatus 74 is shown to include a hub member 76 that is fixed for rotation on rear output shaft 34, a blocker ring 78, and an axially shiftable mode clutch 80 which is in constant axially sliding engagement with hub 76. To shift part-time transfer case 10 from the two-wheel high-range drive mode (2 WH) to the four-wheel high-range (4 WH) mode, the vehicle operator actuates a shift mechanism for causing axial movement of mode clutch 80 and subsequent actuation of synchronizer clutch apparatus 74. One example of a shift mechanism is shown and described in previously-noted U.S. Pat. No. 5,076,112. As is known, actuation of synchronizer clutch apparatus 74 causes speed synchronization between rear output shaft 34 and chain carrier 58 such that mode clutch 80 may thereafter be releasably coupled to chain carrier 58. As will be appreciated, movement of mode clutch 80 in an opposite or second direction acts to reverse the "mode" shifting sequence for returning transfer case 10 to the two-wheel high-range drive mode (2 WH). Typically, the shift mechanism maintains planetary gear assembly 32 in its high-range operating state (i.e., maintaining a "direct-drive" connection between input shaft 24 and rear output shaft 34) during "mode" shifting.

Planetary gear assembly 32 is shown to include a sun gear 82 integrally formed on input shaft 24 and a plurality of planet gears 84 that are meshed with sun gear 82. Each planet gear 84 is rotatably journaled on a pinion shaft 86 having its opposite ends supported in a planetary carrier 88. Preferably, planetary carrier 88 is constructed to include fore and aft annular ring members 90 and 92, respectively, that are secured together by suitable fasteners (not shown). A locking disk 94 is secured to ring member 90 for rotation with planetary carrier 88. Planet gears 84 also mesh with the internal gear teeth formed on an annulus or ring gear 96 that is non-rotatably secured to front housing section 16. Ring gear 96 is additionally retained against rearward axial movement from stop shoulder 98 by a snap ring 100. While not critical to the present invention, it is preferable that planetary gear assembly 32 be of the helical type. That is, sun gear 82, planet gears 84, and ring gear 96 all are formed to have helical gear teeth. To contain the axial thrust loads generated due to the helical gear teeth, and facilitate relative rotation between sun gear 82 and planetary carrier 88, thrust washers 102 are located between the laterally spaced radial edge surfaces of sun gear 82 and the inner surfaces of ring member 92 and locking disk 94. In this manner, planetary carrier 88 is axially restrained by sun gear 82 while being free to float radially for negating or substantially minimizing unbalanced torque loading thereon.

In accordance with the principles of the present invention, a synchronized range shift arrangement 110 is provided in conjunction with planetary gear assembly 32, and which is operable to permit the vehicle operator to shift transfer case 10 "on-the fly" from the four-wheel low-range (4 WL) mode to the four-wheel high-range (4 WH) mode. It is to be understood that, while shown in conjunction with part-time transfer case 10, synchronized range shift arrangement 110 is adapted for virtually any four-wheel drive transfer unit having a planetary-type gear reduction unit incorporated therein. In general, synchronized shift arrangement 110 of the present invention incorporates a second synchronizer clutch apparatus 112 that is operably located between input shaft 24 and rear output shaft 34. While synchronizer clutch apparatus 112 is shown as a strut-type synchronizer, it is to be understood that any suitable synchronizing clutch device or the like can be readily adapted for use with the present invention.

Figure 3:
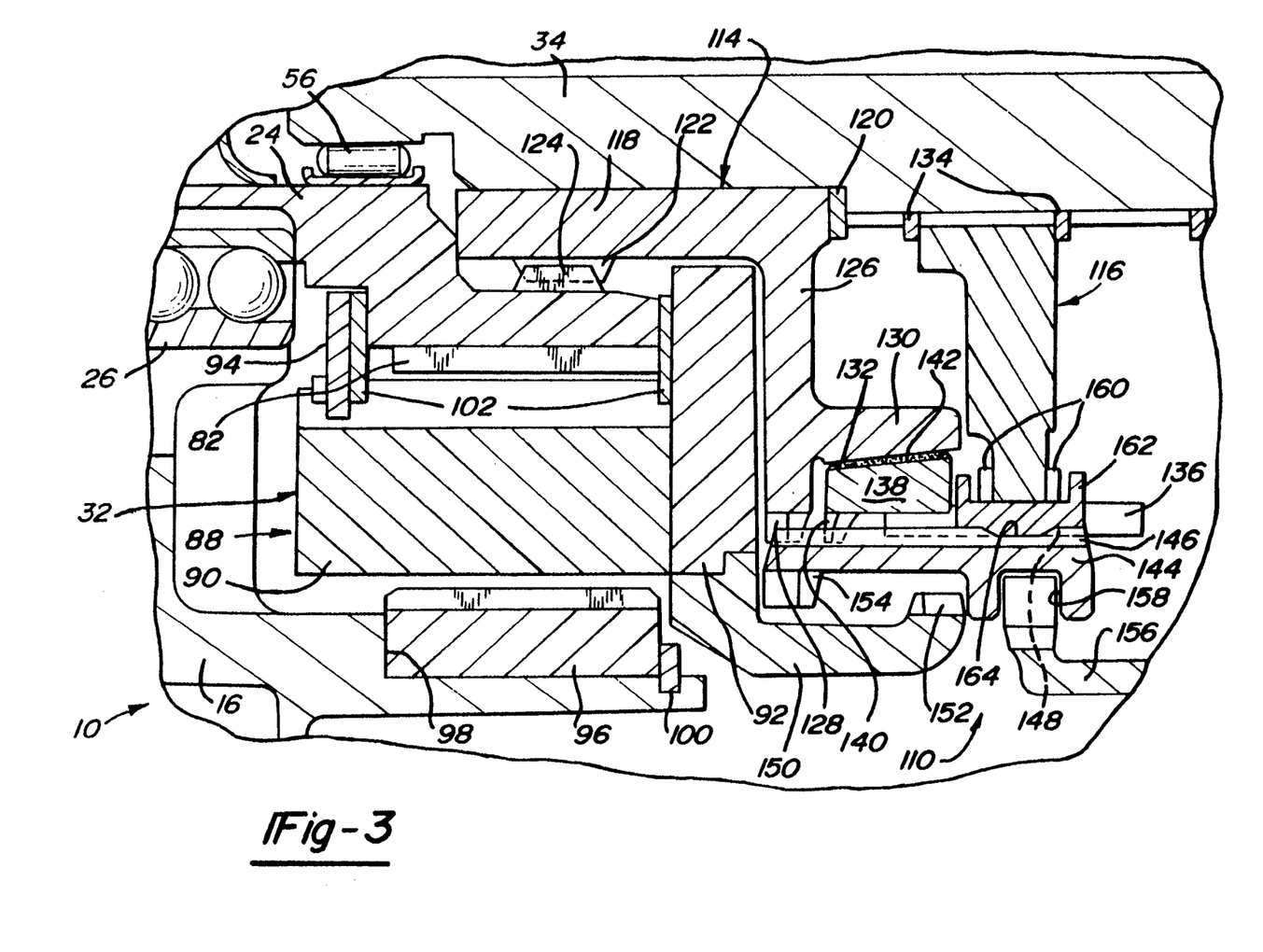
FIG. 3 is a view, similar to FIG. 2, illustrating the planetary-type gear reduction unit shifted to a four-wheel high-range operating mode.

According to one embodiment of the present invention, synchronized shift arrangement 110 includes a direct-drive member 114 coupled for rotation with input shaft 24, a hub member 116 coupled for rotation with rear output shaft 34, and means for coupling hub member 116 to direct-drive member 114 in response to energization of synchronizer clutch apparatus 112. As seen in FIGS. 2 and 3, direct-drive member 114 has a longitudinally extending sleeve portion 118 which is journally supported on rear output shaft 34. A thrust washer 120 is located between one end of sleeve portion 118 and a radial shoulder on rear output shaft 34 for facilitating relative rotation therebetween. Direct-drive member 114 is driven by input shaft 24 and is shown to include external gear teeth 122 formed on sleeve portion 118 that are in constant meshing engagement with internal sun gear teeth 124. Direct-drive member 114 further includes a radially projecting disk portion 126 having external clutch teeth 128 formed along its outer periphery. Projecting transversely from disk portion 126 is an annular projection 130 on which is formed an external frusto-conical friction surface 132.

Hub member 116 is fixed for rotation on rear output shaft 34 and is axially restrained thereon via snap rings 134. Hub member 116 has an outer cylindrical portion 136 which generally encircles a blocker ring 138. Blocker ring 138 has external teeth 140 formed at its forward end and an internal frusto-conical friction surface 142 arranged to surround external frusto-conical friction surface 132 on rim projection 130 of direct-drive member 114.

With continued reference to FIGS. 2 and 3, a range sleeve 144 is formed with internal spline teeth 146 which are in constant axial sliding engagement with external spline teeth 148 formed on cylindrical portion 136 of hub member 116. Aft carrier ring 92 is shown to include an annular extension member 150 which can be formed integral therewith or affixed thereto using suitable fasteners and/or using conventional welding or brazing techniques. Since planetary carrier 88 is continuously driven about sun gear 82 and ring gear 96 at a reduced speed in response to rotation of input shaft 24, extension member 150 is likewise continuously driven at the reduced ratio speed. Extension member 150 has internal clutch teeth 152 formed thereon that drivingly engage external clutch teeth 154 of range clutch 144 upon range sleeve 144 being shifted from the four-wheel high-range position (FIG. 3) to the four-wheel low-range position (FIG. 2).

When it is desired to shift planetary gear assembly 32 from the four-wheel high-range (4 WH) mode into the four-wheel low-range (4 WL) mode, a shift fork 156 engaged in an annular groove 158 of range clutch 144 is moved via the shift mechanism for causing axial movement of range sleeve 144 in a first direction, such movement causing spline teeth 146 of range sleeve 144 to disengage clutch teeth 128 on direct-drive member 114 and teeth 140 on blocker ring 138 so as to initially place planetary gear assembly 32 in the "Neutral" position of FIG. 1. As noted, when range sleeve 144 is shifted to the "Neutral" position, no driving torque is transmitted from input shaft 24 to rear output shaft 34, whereby no power is supplied to either of the vehicle's rear or front sets of ground-engaging wheels. From the "Neutral" position, continued movement of range sleeve 144 in the first direction causes external clutch teeth 154 on range clutch 144 to engage clutch teeth 152 on extension member 150 for placing transfer case 10 in the four-wheel low-range (4 WL) drive mode. In this position (FIG. 2), the reduced ratio drive of planetary carrier 88 is transferred from extension member 150 through range sleeve 144 and hub member 116 to rear output shaft 34. Typically, the motor vehicle must be stopped, or in a substantially non-motive condition, when attempting to shift from the four-wheel high-range (4 WH) drive mode into the four-wheel low-range (4 WL) drive mode.

In operation, synchronized range shift arrangement 110 is constructed to cause speed synchronization between input shaft 24 and rear output shaft 34 for permitting "on-the-fly" shifting of transfer case 10 from the four-wheel low-range (4 WL) mode to the four-wheel high-range (4 WH) mode. To accomplish this, "range" synchronizer clutch apparatus 112 includes a thrust mechanism for axially moving second blocker ring 138 toward disk portion 126 of direct-drive member 114 upon axial movement of range sleeve 144 in the opposite or second direction. The thrust mechanism is shown to comprise a pair of circular energizing springs 160 that are compressed and inserted between a plurality of circumferentially spaced struts 162. As such, struts 162 are retained and outwardly biased within longitudinally extending slots formed in outer cylindrical portion 138 of hub member 116. Each strut 162 has a raised central "bump" portion which is normally biased by energizing springs 160 into engagement with a corresponding detent groove 164 formed in internal spline teeth 146 when range sleeve 144 is in the "Neutral" position.

The sequence of steps or phases associated with the synchronized four-wheel low-range (4 WL) to four-wheel high-range (4 WH) range shifting process will now be described in greater detail. Initial movement of range sleeve 144 from the four-wheel low-range (4 WL) position of FIG. 2 (or the "Neutral" position of FIG. 1) occurs due to selective actuation of the shift mechanism by the vehicle operator. More particularly, actuation of the shift mechanism results in axial movement of range fork 156 and range sleeve 144 in the second direction. Upon initial contact of struts 162 with blocker ring 138, running clearances between range sleeve 144 and blocker ring 138, and between the frusto-conical friction surfaces 142 and 132 on blocker ring 138 and rim projection 130, respectively, are taken up. Upon continued movement of range sleeve 144 in the second direction, a detent load is built-up such that blocker ring 138 and direct-drive member 114 are loaded upon struts 162 riding out of detent groove 164.

The next phase of the synchronization process is the "energization" phase wherein blocker ring 138 moves to an indexed or "clocked" position for blocking continued axial movement of range sleeve 144 until speed synchronization between direct-drive member 114 and hub member 116 is complete. More particularly, an initial frictional "cone" torque loading is developed due to the frictional loading between blocker ring inner frusto-conical surface 142 and external frusto-conical surface 132 of direct-drive member 114. This initial cone torque loading causes blocker ring 138 to rotate in one direction to a "clocked" position until the chamfers on clutch spline teeth 146 contact the chamfers on blocker ring teeth 140 for "blocking" axial passage of range sleeve 144 therethrough. When the rotational speed of direct-drive member 114 is synchronous with hub member 116 and, in turn, rear output shaft 34, the speed synchronization process is complete and blocker ring 138 is no longer energized. Since the index torque resulting from the chamfer-to-chamfer loading between range sleeve internal splines 146 and blocker ring teeth 140 now exceeds the cone torque, blocker ring 138 is free to rotate in the opposite direction from its indexed position. Therefore, internal spline teeth 146 on range sleeve 144 are able to pass beyond blocker ring teeth 140 a predetermined distance until initial contact is made with the chamfers of external clutch teeth 128 of direct-drive member 114. Thereafter, an index torque is built on the respective chamfers for permitting range sleeve spline teeth 146 to lockingly engage clutch teeth 128 of direct-drive member 114. In this manner, rear output shaft 34 is directly coupled to input shaft 24 via range sleeve 144 coupling direct-drive member 114 to hub member 116. In view of incorporation of synchronizer clutch apparatus 112, transfer case 10 can be "locked-up" in the four-wheel high-range (4 WH) mode, as is illustrated in FIG. 3, while the motor vehicle is in a motive operative state.

Figure 4:
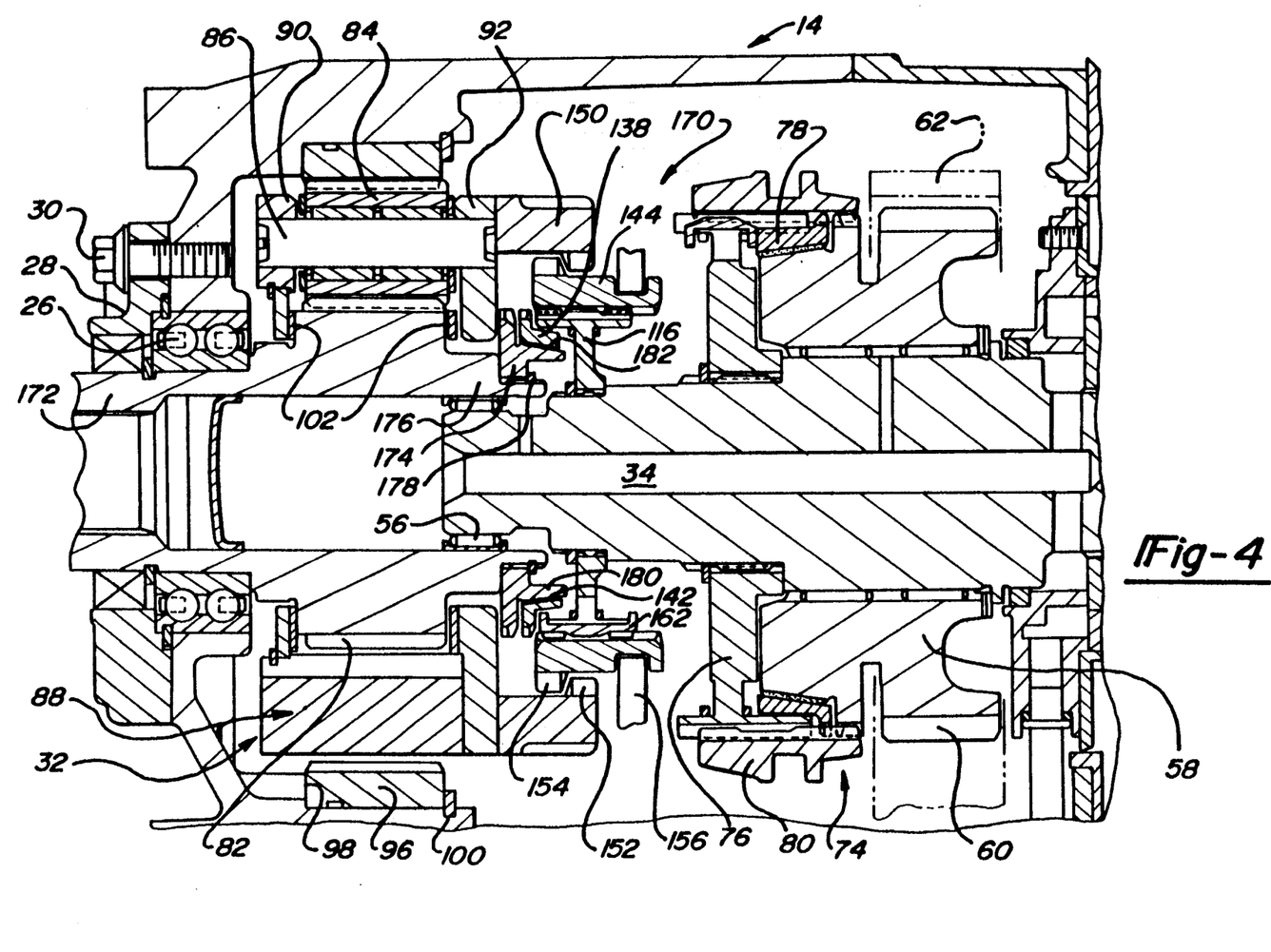
FIG. 4 is a partial sectional view of synchronized range shift arrangement constructed according to an alternative preferred embodiment of the present invention.

With particular reference now to FIG. 4, an alternative construction for a synchronized range shift arrangement 170 is shown. In general, synchronized range shift arrangement 170 is substantially identical in function and form to synchronized range shift arrangement 110, with the exception that the construction of input shaft 172 and direct-drive member 174 have been slightly modified. As such, like numbers are used to identify components that are substantially identical to those previously described.

In general, input shaft 172 has been modified to integrate tubular sleeve portion 118 of direct-drive member 114 therein such that direct-drive member 174 is now retained on an axial sleeve portion 176 integrally formed on input shaft 172. Direct-drive member 174 is a disk-like hub retained against a radial shoulder of input shaft 172 via a snap ring 178. Direct-drive member 174 includes a traversely projecting annular portion 180 on which is formed an external frusto-conical friction surface 182 which is surrounded by external frustoconical surface 142 of blocker ring 138. A suitable bearing assembly 56 is provided for journally supporting sleeve portion 176 of input shaft 172 on the piloted end of output shaft 34.

While specific embodiments of the unique synchronized shift arrangement for use with planetary-type speed reduction units have been shown and described in detail in conjunction with part-time transfer case 10, it will be understood that the present invention may likewise be readily incorporated into full-time transfer cases and other environments where similar operating characteristics may be desired. Furthermore, it will be appreciated by those skilled in the art that the present invention may be embodied in other forms without departing from the principles and the fair scope of the present invention.

What is claimed is:

1. A power transfer apparatus comprising:
   a housing;
   a first member supported for rotation in said housing;
   a second member supported in said housing for rotation relative to said first member;
   a planetary gear assembly coupled to said first member for rotatably driving an output member at a reduced ratio relative to said first member;
   clutch means supported for rotation with said second member and movable between a first position for coupling said second member to said output member of said planetary gear assembly for rotatably driving said second member at said reduced ratio, and a second position for coupling said second member for rotation with said first member; and
   synchronizer means for causing speed synchronization between said first and second members in response to movement of said clutch means from said first position to said second position.

2. The power transfer apparatus of claim 1 wherein said planetary gear assembly includes a sun gear, a ring gear, and said output member comprising a carrier and a plurality of planet gears supported from said carrier, said planet gears in meshing engagement with said sun gear and said ring gear such that said carrier is driven at said reduction ratio drive with respect to said first member.

3. The power transfer apparatus of claim 2 wherein said first member includes an input shaft on which said sun gear is secured and a direct-drive member rotatively driven by said input shaft, said synchronizer means being disposed between said direct-drive member and said clutch means such that said clutch means is coupled to said direct-drive member when said clutch means is in said second position.

4. The power transfer apparatus of claim 3 wherein said synchronizer means comprises blocking means disposed between said clutch means and said direct-drive member for inhibiting movement of said clutch means to said second position until said clutch means and said second member are rotating substantially synchronously with said direct-drive member.

5. The power transfer apparatus of claim 4 wherein said direct-drive member has a first conical surface and said blocking means has a second conical surface arranged for frictional engagement with said first conical surface, said synchronizer means further comprising thrust means for moving said blocking means toward said direct-drive member in response to movement of said clutch means toward said second position for effecting frictional engagement between said first and second conical surfaces, said frictional engagement causing said blocking means to index to a position for inhibiting further movement of said clutch means toward said second position until speed synchronization between said second member and said direct-drive member causes said blocking means to index to a position permitting passage of said clutch means therethrough, whereby said clutch means is coupled to said direct-drive member.

6. The power transfer apparatus of claim 1 wherein movement of said clutch means to said first position establishes said reduction ratio drive for transferring torque from said first member through said output member and said clutch means to said second member, and wherein movement of said clutch means to said second position establishes a direct drive for transferring torque from said first member directly to said second member.

7. The power transfer apparatus of claim 6 wherein said synchronizer means is disposed between said first member and said clutch means such that said clutch means is coupled to said first member when said clutch means is in said second position, said synchronizer means having blocking means disposed between said clutch means and said first member for inhibiting movement of said clutch means to said second position until said clutch means and said second member are rotating substantially synchronously with said first member.

8. The power transfer apparatus of claim 7 wherein said first member has a first conical surface and said blocking means has a second conical surface arranged for frictional engagement with said first conical surface, said synchronizer means further comprising thrust means for moving said blocking means toward said first member in response to movement of said clutch means toward said second position for effecting frictional engagement between said first and second conical surfaces, said frictional engagement causing said blocking means to index to a position for inhibiting further movement of said clutch means toward said second position until speed synchronization between said second member and said first member causes said blocking means to index to a position permitting passage of said clutch means therethrough, whereby said clutch means is coupled to said first member.

9. A transfer case for a four-wheel drive motor vehicle comprising:
a housing;
an input shaft supported for rotation in said housing;
an output shaft supported for rotation in said housing;
planetary gear reduction means for selectively interconnecting said input shaft to said output shaft to define a four-wheel high-range drive mode and a four-wheel low-range drive mode;
a shift member movable between a first position for shifting said planetary gear reduction means into said high-range mode and a second position for shifting said planetary gear reduction into said low-range mode; and
synchronizer means for causing speed synchronization between said input shaft and said output shaft in response to movement of said shift member from said second position to said first position.

10. The transfer case of claim 9 wherein movement of said shift member to said first position establishes a direct-drive for transferring torque from said input shaft to said output shaft, and movement of said shift member to said second position establishes a reduction ratio drive for transferring torque from input shaft through an output member of said planetary gear reduction means to said output shaft.

11. The transfer case of claim 10 wherein said planetary gear reduction means includes a sun gear, a ring gear, and a plurality of planet gears supported from a carrier, said planet gears in meshing engagement with said sun gear and said ring gear such that said carrier is driven at said reduction drive with respect to said input shaft.

12. The transfer case of claim 11 further comprising a direct-drive member rotatively driven by said input shaft, and wherein said shift member is a clutch sleeve rotatably supported from said output shaft for sliding movement between said first and second positions, said synchronizer means being disposed between said direct-drive member and said clutch sleeve such that said clutch sleeve is coupled to said direct-drive member when said clutch sleeve is in said first position.

13. The transfer case of claim 12 wherein said synchronizer means comprises blocking means disposed between said clutch sleeve and said direct-drive member for inhibiting movement of said clutch sleeve to said first position until said clutch sleeve and said output shaft are rotating substantially synchronously with said direct-drive member.

14. The transfer case of claim 13 wherein said direct-drive member has a first conical surface and said blocking means has a second conical surface arranged for frictional engagement with said first conical surface, said synchronizer means further comprising thrust means for moving said blocking means toward said direct-drive member in response to movement of said clutch sleeve toward said first position for effecting frictional engagement between said first and second conical surfaces, said frictional engagement causing said blocking means to index to a position for inhibiting further movement of said clutch sleeve toward said first position until speed synchronization between said output shaft and said direct-drive member causes said blocking means to index to a position permitting passage of said clutch sleeve therethrough, whereby said clutch sleeve is coupled to said direct-drive member.

15. A planetary gear assembly comprising:
a housing;
a first member supported for rotation in said housing;
a second member supported in said housing for rotation relative to said first member;
a ring gear secured to said housing;
a planet carrier having a plurality of planet gears supported therefrom in meshing relationship with said first member and said ring gear;
a clutch sleeve supported for rotation with said second member and movable thereon between a high-range position wherein said clutch sleeve is engaged with said first member for transferring torque from said first member directly to said second member, and a low-range position wherein said clutch sleeve is engaged with said planet carrier for transferring torque from said first member to said second member at a reduced drive ratio; and
synchronizer means for causing speed synchronization between said first and second members in response to movement of said clutch sleeve towards said high-range position.

16. The planetary gear assembly of claim 15 wherein said synchronizer means comprises a direct-drive member secured for rotation to said first member, a hub member fixed for rotation with said second member on which said clutch sleeve is engaged for rotation therewith and axial movement relative thereto, and friction loading means disposed between said direct-drive member and said hub member for causing speed synchronization therebetween.

17. The planetary gear assembly of claim 16 wherein said friction loading means comprises a blocker ring and thrust means for axially moving said blocker ring towards said direct-drive member upon movement of said clutch sleeve towards said high-range position.

18. A power transfer apparatus for a motor vehicle comprising:
a housing;
an input shaft supported for rotation in said housing;
an output shaft supported in said housing for rotation relative to said input shaft;
a planetary gear assembly coupled to said input shaft and including an output member adapted to be rotatably driven at a reduced speed ratio relative to said input shaft;
clutch means supported for rotation with said output shaft and movable between a first position for coupling said output shaft to said output member of said planetary gear assembly for establishing a low-range drive mode for transferring drive torque from said input shaft through said planetary gear assembly to said output shaft, and a second position for coupling said output shaft to said input shaft for establishing a high-range drive mode for directly transferring drive torque to said output shaft independent from said planetary gear assembly; and
synchronizer means for causing speed synchronization between said input shaft and said output shaft in response to movement of said clutch means from said first position to said second position, said synchronizer means being operable to permit the power transfer apparatus to be shifted from said low-range drive mode to said high-range drive mode without stopping rotation of said input shaft.

19. The power transfer apparatus of claim 18 wherein said planetary gear assembly further includes a sun gear rotatably coupled to said input shaft, a ring gear non-rotatably coupled to said housing, and wherein said output member includes a carrier from which a plurality of planet gears are supported, said planet gears being in meshing engagement with said sun gear and said ring gear such that said carrier is driven at said reduced speed ration with respect to said input shaft, said synchronizer means comprising blocking means disposed between said clutch means and said input shaft for inhibiting movement of said clutch means to said second position until said clutch means and said output shaft are rotating substantially synchronously with said input shaft.

20. A two-speed power transfer apparatus for a motor vehicle of the type including a transmission having a transmission output shaft, said two-speed power transfer apparatus comprising:

a housing;

an input shaft supported for rotation in said housing and coupled for driven rotation with the transmission output shaft;

an output shaft supported for rotation in said housing;

a planetary gear assembly including a sun gear coupled for rotation within said input shaft, a ring gear fixed for non-rotation to said housing, a carrier, and a plurality of planet gears supported from said carrier, said planet gears in meshing engagement with said sun gear and said ring gear such that said carrier is driven at a reduced ratio with respect to said input shaft;

synchronizer means for causing speed synchronization between said input shaft and said output shaft, said synchronizer means including a hub member fixed for rotation on said output shaft, a drive member coupled for rotation with said input shaft and having a first synchronizing surface formed thereon, and a blocker ring having a second synchronizing surface formed thereon which is adapted for frictional engagement with said first synchronizing surface on said drive member; and a clutch sleeve coupled for rotation with said hub member and which is axially movable thereon between a first position where a low-range drive mode is established and a second position where a high-range drive mode is established, and wherein movement of said clutch sleeve to said first position establishes a first torque path for transferring drive torque delivered to said input shaft from the transmission output shaft through said planetary gear assembly to said output shaft, and wherein movement of said clutch sleeve to said second position establishes a second torque path for transferring drive torque from said input shaft through said drive member to said output shaft.

21. The two-speed power transfer apparatus of claim 20 wherein said drive member is integrally formed with said input shaft.

22. The two-speed power transfer apparatus of claim 20 wherein said carrier includes a longitudinally extending portion having clutch teeth formed thereon adapted for engagement with clutch teeth formed on said clutch sleeve when said clutch sleeve is moved to said first position.

* * * * *